(12) United States Patent
Kunimochi

(10) Patent No.: US 9,465,157 B2
(45) Date of Patent: Oct. 11, 2016

(54) SPREAD ILLUMINATING APPARATUS

(71) Applicant: MINEBEA CO., LTD., Kitasaku-gun, Nagano (JP)

(72) Inventor: Toru Kunimochi, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 73 days.

(21) Appl. No.: 14/564,627

(22) Filed: Dec. 9, 2014

(65) Prior Publication Data

US 2015/0219824 A1    Aug. 6, 2015

(30) Foreign Application Priority Data

Jan. 31, 2014    (JP) .................................. 2014-017484

(51) Int. Cl.
*F21V 8/00* (2006.01)
*G02B 6/43* (2006.01)

(52) U.S. Cl.
CPC ............ *G02B 6/0031* (2013.01); *G02B 6/0021* (2013.01); *G02B 6/0026* (2013.01); *G02B 6/0046* (2013.01)

(58) Field of Classification Search
CPC .. G02B 6/0018; G02B 6/002; G02B 6/0021; G02B 6/0026; G02B 6/0031; G02B 6/0045; G02B 6/0046
USPC ................................................ 362/610, 628
See application file for complete search history.

(56) References Cited

U.S. PATENT DOCUMENTS

| | | | | |
|---|---|---|---|---|
| 8,118,465 B2* | 2/2012 | Kunimochi | .......... | G02B 6/0046 362/612 |
| 8,164,820 B2* | 4/2012 | Cho | .................... | G02B 6/0021 359/290 |
| 8,439,547 B2* | 5/2013 | Chiu | ................ | G02F 1/133609 349/62 |
| 9,198,258 B2* | 11/2015 | Kim | .................. | G02F 1/133512 |
| 9,268,080 B2* | 2/2016 | Lee | ....................... | G02B 6/0011 |
| 2008/0175022 A1* | 7/2008 | Sugiura | ................ | G02B 6/0091 362/609 |
| 2014/0340933 A1* | 11/2014 | Lin | ...................... | G02B 6/0028 362/610 |

FOREIGN PATENT DOCUMENTS

| JP | A-2005-347010 | 12/2005 |
|---|---|---|
| JP | A-2012-94283 | 5/2012 |

* cited by examiner

*Primary Examiner* — Alan Cariaso
(74) *Attorney, Agent, or Firm* — Oliff PLC

(57) ABSTRACT

A spread illuminating apparatus includes a light source that emits white light, and a light guide plate including an incident light surface which is an end surface at which the light source is disposed and an emitting part that emits light which has entered from the incident light surface in a spread pattern from an emitting surface. The light guide plate includes an incident light wedge part between the incident light surface and the emitting part, the incident light wedge part including an inclined surface and tapering in thickness from the incident light surface side toward a forward direction. Also, a blue light reflecting unit is disposed on at least one of the emitting surface side or an opposite side of the emitting surface side near a boundary between the incident light wedge part and the emitting part.

5 Claims, 5 Drawing Sheets

F I G. 4 A
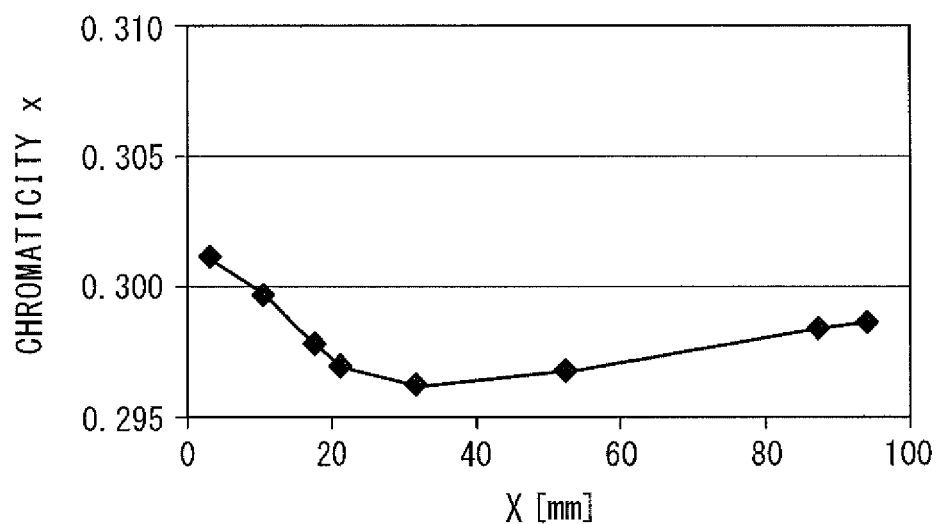
F I G. 4 B
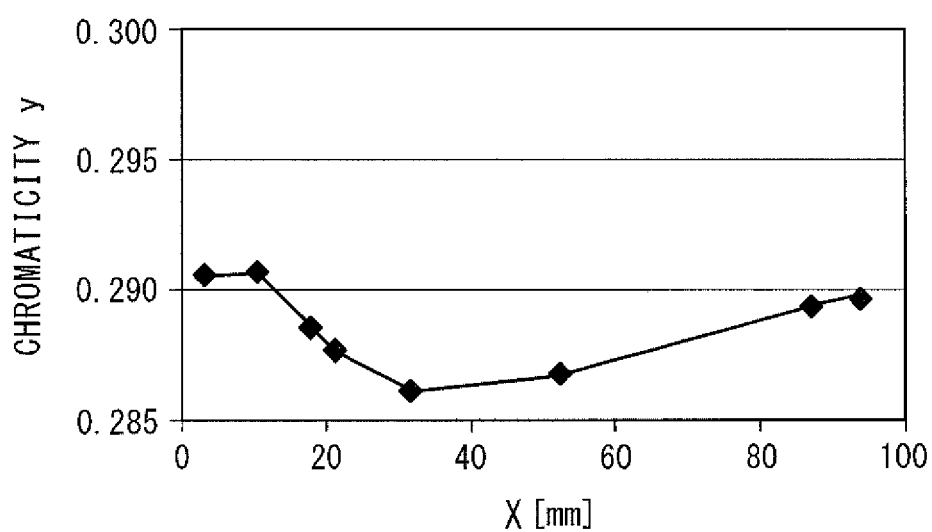

F I G. 5 A
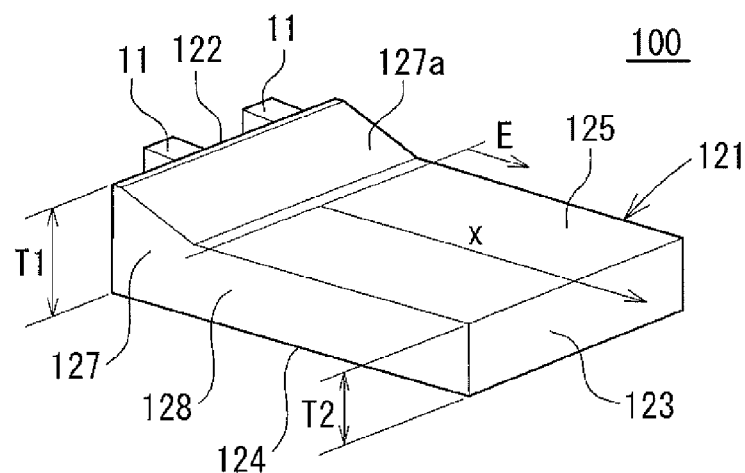
F I G. 5 B
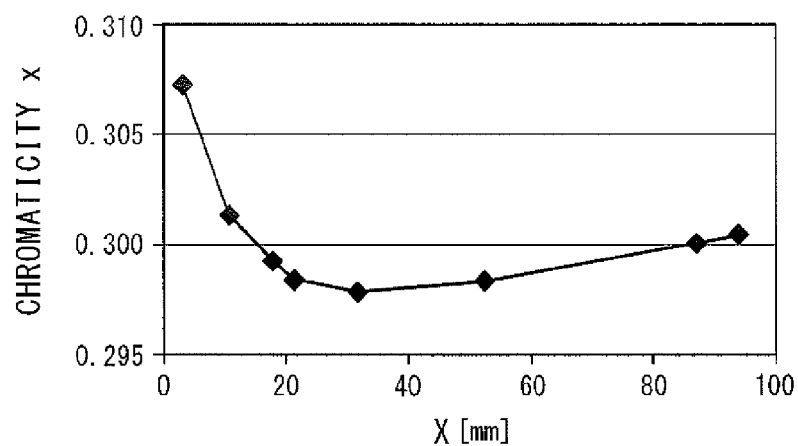
F I G. 5 C
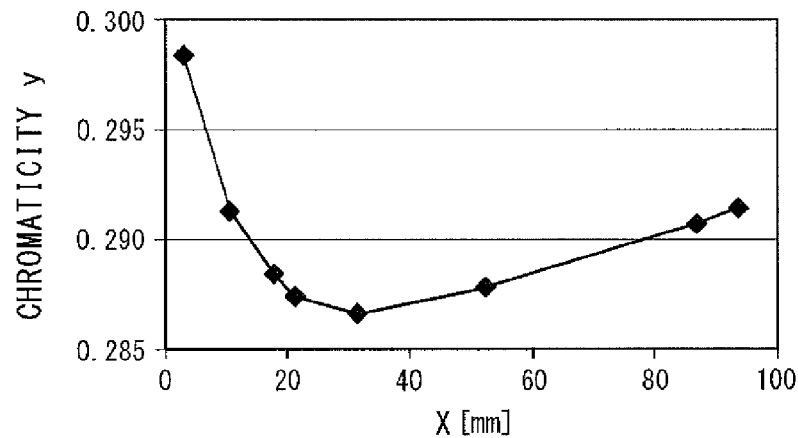

SPREAD ILLUMINATING APPARATUS

BACKGROUND OF THE INVENTION

1. Field of the Invention

The present invention relates to a sidelight-type spread illuminating apparatus including a light guide plate that has a light source disposed at a light incident end surface thereof and emits illumination light in a spread pattern from an emitting part.

2. Description of the Related Art

As an illumination unit for a liquid crystal display panel, a sidelight-type spread illuminating apparatus (backlight) in which a light source that emits white light is disposed along a side end surface of a light guide plate is widely utilized. There have been efforts in the past to make such spread illuminating apparatuses thinner and brighter and improve their brightness uniformity and the like. However, recently there has been increased demand for further enhancements to the color tone uniformity of emitted light in accordance with advancements in high definition of liquid crystal display panels. Conventionally, with regard to color tone uniformity, most development has been exclusively geared towards measures for eliminating color unevenness that occurs across the entire emitting surface of the light guide plate (for example, refer to Japanese Patent Application Laid-Open (JP-A) No. 2005-347010 and Japanese Patent Application Laid-Open (JP-A) No. 2012-94283).

SUMMARY OF THE INVENTION

However, color unevenness that occurs partially on the light guide plate due to recent reductions in the thickness of light guide plates has emerged as a new problem. In particular, mainly in the field of compact mobile information devices such as mobile telephones, light guide plates in which the thickness of an emitting portion thereof is decreased regardless of the thickness of an LED by forming a wedge part, whose thickness tapers moving away from the side end surface at which the light source is disposed (hereinafter referred to as the "incident light surface"), between the incident light surface and the emitting part are currently in wide use. However, in such light guide plates, it has been discovered that light emitted from a region of the emitting part toward the incident light wedge part exhibits a yellow color, and this causes visible color unevenness to occur.

The present invention was created in consideration of the above-described problems, and an object thereof is to provide a spread illuminating apparatus that suppresses any color unevenness that occurs partially on an incident light surface side of a light guide plate and achieves excellent color tone uniformity of emitted light.

The embodiments of the invention described below are examples of the structure of the present invention. In order to facilitate the understanding of the various structures of the present invention, the explanations below are divided into aspects. Each aspect does not limit the technical scope of the present invention, and the technical scope of the present invention can also include structures in which a portion of the components in the aspects below is substituted or deleted, or another component is added upon referring to the best modes for carrying out the invention.

According to a first aspect of the present invention, a spread illuminating apparatus includes: a light source that emits white light, and a light guide plate including an incident light surface which is an end surface at which the light source is disposed and an emitting part that emits light which has entered from the incident light surface in a spread pattern from an emitting surface which is one principal surface, wherein the light guide plate includes an incident light wedge part between the incident light surface and the emitting part, the incident light wedge part including an inclined surface and tapering in thickness from the incident light surface side toward a forward direction, and a blue light reflecting unit is disposed on at least one of the emitting surface side or an opposite side of the emitting surface side near a boundary between the incident light wedge part and the emitting part.

With this structure, by disposing a blue light reflecting unit on at least one of an emitting surface side or an opposite surface side of the emitting surface side near a boundary between the incident light wedge part and the emitting part, a blue light component of at least a portion of light that has leaked from the incident light wedge part and a region of the emitting part toward the incident light wedge part is selectively returned into the light guide plate. Thereby, the blue light component of light that is emitted from a region of the emitting part toward the incident light wedge part is increased relative to light components having longer wavelength than that of blue light (specifically, a range from red light to green light including yellow light), and thus visible color unevenness caused by the region toward the incident light wedge part of the emitting part exhibiting a yellow color can be suppressed, and in turn, the color tone uniformity of light emitted from the light guide plate can be enhanced.

Further, with this structure, the vicinity of the boundary between the incident light wedge part and the emitting part at which the blue light reflecting unit is disposed can be a region including only the incident light wedge part, or a region including only the emitting part, or a region including both the incident light wedge part and the emitting part. In addition, a region including both the incident light wedge part and the emitting part can include the boundary between the incident light wedge part and the emitting part itself, but it does not have to include this boundary.

Further, according to the first aspect of the invention, the blue light reflecting unit is disposed such that it spans across the boundary between the incident light wedge part and the emitting part.

With this structure, the blue light component of light emitted from the region toward the incident light wedge part of the emitting part can be more reliably increased relative to light components having a longer wavelength than that of blue light.

Further, according to the first aspect of the invention, the blue light reflecting unit is provided on a surface facing the light guide plate of a circuit board on which the light source is mounted.

With this structure, the blue light reflecting unit can be easily provided using a circuit board without increasing the number of parts, and this blue light reflecting unit can efficiently return the blue light component of at least a portion of light that has leaked from the incident light wedge part and the region toward the incident light wedge part of the emitting part into the light guide plate.

Further, according to the first aspect of the invention, the blue light reflecting unit includes a portion disposed to be inclined in an inclination direction of the inclined surface.

With this structure, the blue light reflecting unit includes a portion that is disposed to be inclined in an inclination direction of the inclined surface, and light reflected from this portion can be efficiently returned into the light guide plate without allowing it to progress to the emitting surface side.

Further, according to the first aspect of the invention, a pedestal on which the circuit board is disposed is provided on the inclined surface side of the incident light wedge part.

With this structure, in a state in which the circuit board is disposed on the pedestal, a gap can be formed between the inclined surface in the portion in front of the light source and the circuit board. Therefore, direct absorption of light that has reached the inclined surface after entering into the light guide plate by the circuit board can be suppressed, and light that is emitted from the light source can be efficiently guided via the incident light wedge part.

Further, according to the first aspect of the invention, the light source includes a light-emitting element and fluorescent bodies that receive and emit light that is emitted by the light-emitting element.

With this structure, color unevenness of the region toward the incident light wedge part of the emitting part can be suppressed by the blue light reflecting unit disposed on at least one of an emitting surface side or an opposite surface side of the emitting surface side near the boundary between the incident light wedge part and the emitting part, and an inexpensive white light source that generates quasi-white light from a light-emitting element and fluorescent bodies can be used.

Further, according to the first aspect of the invention, the light-emitting element is a blue light-emitting diode that emits blue light, and the fluorescent bodies are yellow fluorescent bodies that emit yellow light.

With this structure, color unevenness of the region toward the incident light wedge part of the emitting part can be suppressed by the blue light reflecting unit disposed on at least one of an emitting surface side or an opposite surface side of the emitting surface side near the boundary between the incident light wedge part and the emitting part, and an inexpensive white LED that generates quasi-white light from a blue light-emitting diode and yellow fluorescent bodies can be used.

Further, according to the first aspect of the invention, the fluorescent bodies are dispersed in an enclosure that covers the light-emitting element.

With this structure, color unevenness of the region toward the incident light wedge part of the emitting part can be suppressed by the blue light reflecting unit disposed on at least one of an emitting surface side or an opposite surface side of the emitting surface side near the boundary between the incident light wedge part and the emitting part, and an inexpensive white light source in which fluorescent bodies are dispersed in an enclosure that covers a light-emitting element can be used.

According to the present invention, with the above structures, a spread illuminating apparatus that suppresses any color unevenness that occurs partially on an incident light surface side of a light guide plate and achieves excellent color tone uniformity of emitted light can be provided.

BRIEF DESCRIPTION OF DRAWINGS

FIGS. 4A and 4B illustrate the results upon measuring the color of emitted light at multiple measurement points on a light guide plate using the spread illuminating apparatus according to one embodiment of the present invention, wherein FIG. 4A is a graph illustrating the x coordinate value on an xy chromaticity diagram of the CIE color specification system relative to a distance in a light guide direction from a position in an effective emitting region that is closest to the incident light surface side, and FIG. 4B is a graph illustrating the y coordinate value on an xy chromaticity diagram of the CIE color specification system relative to a distance in a light guide direction from a position in an effective emitting region that is closest to the incident light surface side;

FIGS. 5A to 5C illustrate the results upon measuring the color of emitted light at multiple measurement points on a light guide plate using a spread illuminating apparatus according to a reference example of the present invention, wherein FIG. 5A is a schematic view illustrating the essential structure of the spread illuminating apparatus used for the measurements, FIG. 5B is a graph illustrating the x coordinate value on an xy chromaticity diagram of the CIE color specification system relative to a distance in a light guide direction from a position in an effective emitting region that is closest to the incident light surface side, and FIG. 5C is a graph illustrating the y coordinate value on an xy chromaticity diagram of the CIE color specification system relative to a distance in a light guide direction from a position in an effective emitting region that is closest to the incident light surface side;

DETAILED DESCRIPTION

Figure 1:
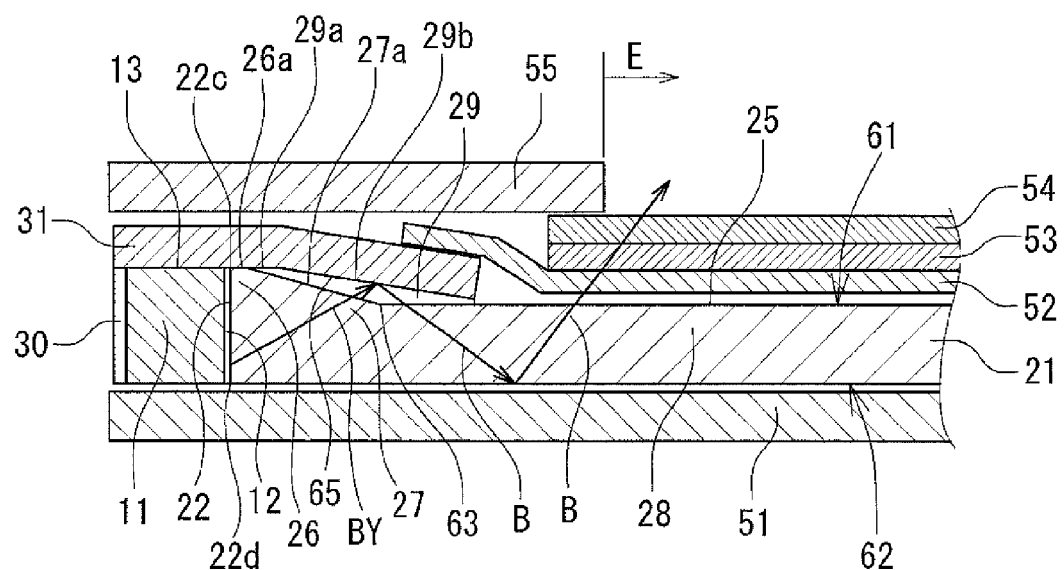
FIG. 1 is a side cross-section view schematically illustrating the essential parts of a spread illuminating apparatus according to one embodiment of the present invention.

A spread illuminating apparatus according to an embodiment of the present invention will be explained below referring to the drawings. In the attached drawings, the shape, dimensions, etc. of each constituent element are appropriately exaggerated in order to facilitate the understanding of the present invention. Also, in the attached drawings, if spaces are illustrated between two adjacent constituent elements, such spaces have been inserted or exaggerated in order to facilitate the understanding of the present invention, and the structure of the present invention should not be construed as limited by the presence/absence of such spaces between adjacent constituent elements or the dimensions of such spaces if they exist.

First, the research process that the inventors followed to reach the present invention will be explained in order to facilitate the understanding of the spread illuminating apparatus according to the present invention. The mechanism by which partial color unevenness on the light guide plate occurs, which is a problem of the present invention, will now be described in detail as follows referring to FIGS. 5 to 7. Herein, FIGS. 5A to 5C illustrate the results upon measuring with a color brightness photometer the color of emitted light at multiple measurement points on a light guide plate 121 using a spread illuminating apparatus 100 according to a reference example of the present invention. As shown in FIG. 5A, in the light guide plate 121 of the spread illuminating apparatus 100, an incident light wedge part 127 having an inclined surface 127a is provided between an incident light surface 122 at which LEDs 11 are disposed and an emitting part 128 having an emitting surface 125. The LEDs 11 are mounted on an FPC (not illustrated), and a portion of the FPC in front of the LEDs (a range covering the inclined surface 127a and a region of the emitting surface 125 toward the inclined surface 127a) is painted black. Also, an effective emitting region E is defined on the emitting surface 125, and the measurement of emitted light was conducted within the range of the effective emitting surface E.

In the graph shown in FIG. 5B, the vertical axis is an x coordinate value on an xy chromaticity diagram of the CIE color specification system (hereinafter also referred to as "chromaticity x"), and the horizontal axis is a distance X [mm] in a light guide direction (direction from the incident light surface 122 toward an opposing end surface 123) from a position in the effective emitting region E of the light guide plate 121 that is closest to the incident light surface 122 side as a starting point. In the graph shown in FIG. 5C, the vertical axis is a y coordinate value on an xy chromaticity diagram of the CW color specification system (hereinafter also referred to as "chromaticity y"), and the horizontal axis is a distance X [mm] in the light guide direction from a position in the effective emitting region E of the light guide plate 121 that is closest to the incident light surface 122 side as a starting point. In FIGS. 5B and 5C, the range shown on the horizontal axis corresponds to approximately the entire length of the effective emitting region E of the light guide plate 121. Further, the measurement points are located approximately in the center in the width direction of the light guide plate 121.

As can be understood from FIGS. 5B and 5C, the chromaticity x and the chromaticity y both increase sharply as X approaches the starting point from near 30 mm, and this sharp increase in both of the chromaticity x and the chromaticity y indicates an increase in the yellow color of the emitted light. Thereby, in the spread illuminating apparatus 100, color unevenness is visible as yellow color on the incident light surface 122 side in the light emitted from the effective emitting region E of the light guide plate 121 (hereinafter, this kind of color unevenness will also be referred to as incident light color unevenness).

Figure 6:
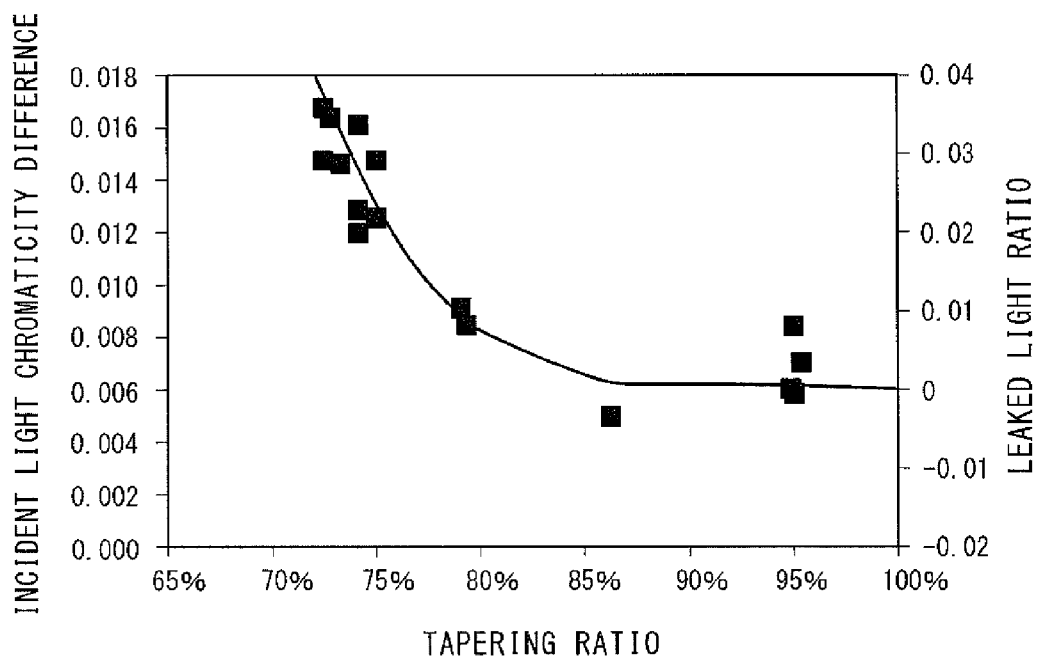
FIG. 6 is a graph illustrating a relationship between a tapering ratio of a light guide plate and an incident light chromaticity difference and a leaked light ratio in the spread illuminating apparatus according to a reference example of the present invention.

Furthermore, in their investigation and research, the inventors also made the following discoveries regarding the relationship between incident light color unevenness and the shape of the light guide plate 121. FIG. 6 is a graph illustrating a relationship between a tapering ratio of the light guide plate 121 and an incident light chromaticity difference and a leaked light ratio. Herein, the tapering ratio of the light guide plate 121 is a ratio (T2/T1) of a minimum thickness T2 of the incident light wedge part 127 (corresponding to the thickness of the emitting part 128) relative to a maximum thickness T1 of the incident light wedge part 127 (corresponding to the thickness of the incident light surface 122). According to this definition, when the length in the light guide direction of the incident light wedge part 127 is fixed, the inclination angle of the inclined surface 127a of the incident light wedge part 127 increases as the tapering ratio decreases.

The incident light chromaticity difference is an indicator defined as follows for evaluating the incident light color unevenness. Basically, the incident light chromaticity difference is defined as a maximum value of a distance on the xy chromaticity diagram between the chromaticity at a measurement point that is closest to the incident light surface 122 side and the chromaticity at another measurement point. Specifically, when the coordinates on the xy chromaticity diagram of the chromaticity at a measurement point (hereinafter referred to as "P0") that is closest to the incident light surface 122 side are (x0, y0) and the coordinates on the xy chromaticity diagram of the chromaticity at a measurement point other than P0 are (xi, yi), the incident light chromaticity difference is the maximum value of a distance Δxy, on the xy chromaticity diagram calculated by $\Delta xy_i = \sqrt{((x0-xi)^2+(y0-yi)^2)}$ for each measurement point other than P0. It can be said that the incident light color unevenness increases as the incident light chromaticity difference defined as above increases.

The leaked light ratio is a ratio (L/I) of an amount of leaked light L that has leaked from the incident light wedge part 127 relative to an amount of incident light 1 that has entered into the light guide plate 121.

In FIG. 6, the incident light chromaticity difference measured at various tapering ratios is plotted with black-filled square shapes, and the relationship between the tapering ratio and the leaked light ratio is illustrated with a solid line. Also, the measurement was carried using light guide plates 121 in which the tapering ratios were different but the length in the light guide direction of the incident light wedge part 127 was fixed.

From FIG. 6, it can be understood that there is a strong correlation between the tapering ratio of the light guide plate 121 and the incident light chromaticity difference. In particular, it can be understood that if the tapering ratio drops below 85%, the incident light chromaticity difference increases as the tapering ratio decreases. In other words, if the inclination angle of the inclined surface 127a of the incident light wedge part 127 increases above a predetermined value corresponding to a tapering ratio of 85%, the incident light color unevenness becomes prominent as the inclination angle of the inclined surface 127a increases.

Also, from FIG. 6, it can be understood that the correlation between the tapering ratio and the incident light chromaticity difference is similar to the relationship between the tapering ratio and the leaked light ratio. The measurements indicating the results in FIGS. 5B and 5C were conducted using a light guide plate 121 with a tapering ratio of 73%, and the incident light chromaticity difference thereof was 0.015.

Through their keen research, the present inventors discovered the following regarding the mechanism by which incident light color unevenness occurs. In general, light emitted from a region on the incident light surface 122 side among light emitted from the effective emitting region E of the light guide plate 121 is emitted from the LEDs 11 and enters into the light guide plate 121 from the incident light surface 122, and then is reflected one or more times between the emitting surface 125 side and an underside surface 124 side of the light guide plate 121 while it is guided through the incident light wedge part 127 and through a region of the emitting part 128 toward the incident light wedge part 127. As a result, this light enters into the emitting surface 125 at an incident angle that is smaller than a critical angle on the incident light surface 122 side of the effective emitting region E of the emitting surface 125, and it is thereby emitted from this position.

Figure 7:
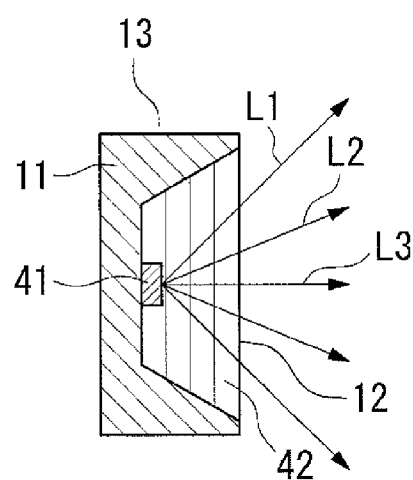
FIG. 7 is a cross-section view illustrating the structure of an LED which is a light source of the spread illuminating apparatus according to a reference example of the present invention and the spread illuminating apparatus according to one embodiment of the present application.

However, as shown in FIG. 7, the LEDs 11 used as a light source in the spread illuminating apparatus 100 have a structure in which a blue light-emitting diode 41 is enclosed in a transparent resin 42 in which yellow fluorescent bodies are dispersed. An emission spectrum that appears white (quasi-white) is realized by the mixture of blue light emitted by the blue light-emitting diode 41 and yellow light emitted by the yellow fluorescent bodies which have absorbed the blue light.

Therein, the distance over which a light L1, which is emitted from the LEDs 11 in a direction in which the angle that forms the optical axis thereof is large, passes through the transparent resin 42 is longer compared to that of a light L2 and a light L3, which are emitted from the LEDs 11 in a direction in which the angle that forms the optical axis thereof is small. Thus, the light L1 is a white light that exhibits a stronger yellow tint compared to the lights L2 and L3. This light L1, which is emitted from the LEDs 11 in a direction in which the angle that forms the optical axis thereof is large and has a strong yellow tint, enters directly, or after being reflected once at the underside surface 124, into the inclined surface 127a of the incident light wedge part 127 at a small incident angle. Thus, this light L1 subsequently follows the optical path described above without being directly guided into the emitting part 128 so as to be emitted from the incident light surface 122 side of the effective emitting region E of the emitting surface 125. On the other hand, the lights L2 and L3 (exhibiting a stronger blue tint than the light L1), which are emitted in a direction in which the angle that forms the optical axis thereof is small, enter into the emitting surface 125 at an incident angle that is larger than a critical angle on the incident light surface 122 side of the effective emitting region E of the emitting surface 125. As a result, these lights L2 and L3 are further guided through the emitting part 128 toward the opposing end surface 123 and then emitted from the emitting surface 125. This is believed to be one mechanism that leads to the occurrence of incident light color unevenness.

For example, if the tapering ratio of the light guide plate 121 decreases and the inclination angle of the inclined surface 127a of the incident light wedge part 127 increases, the angular change when reflecting at the inclined surface 127a increases. Therefore, it is anticipated that the incident light color unevenness arising from the above mechanism would also increase, and this is also illustrated in the correlation between the tapering ratio and the incident light chromaticity difference shown in FIG. 6.

An LED 11 having a structure like that shown in FIG. 7 is widely for industrial and general illumination. Thus, suppressing the occurrence of incident light color unevenness that accompanies the use of such an LED 11 is a very important problem. However, incident light color unevenness is also believed to occur in light sources having other structures. For example, in an LED in which fluorescent bodies of a color other than yellow (such as red and green) having a wavelength that is longer than blue light are dispersed in a transparent resin enclosing a blue light-emitting diode, it is believed that incident light color unevenness occurs due to the same mechanism as that in the LED 11.

Further, incident light color unevenness is also believed to be promoted by the wavelength dispersibility of the refractive index of an optical resin material that constitutes the light guide plate 121. Basically, the refractive index of a resin material exhibits wavelength dispersibility in which the refractive index decreases as the wavelength of light increases. In turn, the critical angle increases as the wavelength increases. Therefore, it can be said that light components having a wavelength that is longer than that of a blue light component among light that enters at a specific incident angle into the incident light surface 122 side of the effective emitting region E of the emitting surface 125 are more easily emitted at that position than a blue light component. In other words, if the specific incident angle is larger than a critical angle relative to blue light but is smaller than a critical angle relative to light having a wavelength that is longer than that of blue light, the blue light component is completely reflected and further guided through the light guide plate 121 toward the opposing end surface 123, but the light components having a wavelength that is longer than that of blue light (for example, the light components of a range from red light to green light including yellow light) are emitted from that position. It is believed that this mechanism is also a factor leading to the occurrence of incident light color unevenness.

Incident light color unevenness caused by wavelength dispersibility of the refractive index of an optical resin material can occur in nearly all white light sources, including light sources consisting of a combination of light-emitting elements (such as a diode) of, for example, red light, green light, blue light, and the like.

In the spread illuminating apparatus 100 used in the measurements indicating the results in FIGS. 5 and 6, a portion of the FPC in front of the LEDs 11 is painted black in order to absorb light that has leaked from the inclined surface 127a and the region of the emitting surface 125 toward the inclined surface 127a. However, in general, the spread illuminating apparatus can also have a structure in which a portion of the FPC in front of the LEDs 11 is painted white so as to reflect light that has leaked from the inclined surface 127a and the region of the emitting surface 125 toward the inclined surface 127a and return it into the light guide plate 121. The reason that an FPC in which the portion in front of the LEDs 11 is painted black was utilized in the spread illuminating apparatus 100 used in the above-mentioned measurements is as follows.

If an FPC in which the portion in front of the LEDs 11 is painted white is utilized, most of the light that is reflected by the white-painted portion and returned into the light guide plate 121 follows the above-described optical path and is emitted from the incident light surface 122 side of the effective emitting region E of the emitting surface 125. Therefore, if this structure is utilized in the case that the amount of light that has leaked from the inclined surface 127a and the region of the emitting surface 125 toward the inclined surface 127a is comparatively large, a so-called hot spot will occur on the incident light surface 122 side of the effective emitting region E, and thus good brightness distribution cannot be obtained. Further, since the leaked light also includes light with a strong yellow tint, returning the light that has leaked from the inclined surface 127a into the light guide plate 121 with no wavelength dependence by the white-painted portion of the FPC may become a factor that exacerbates the incident light color unevenness.

Recently, under the strong demand for decreasing the thickness of light guide plates, it has become common to decrease the thickness of the emitting part 128 by decreasing the tapering ratio. For example, there has been a tendency to decrease the tapering ratio to less than 80%. Under these circumstances, it has become increasingly vital to solve the problem of incident light color unevenness.

The present inventors reached the present invention as a result of the diligent research described above. Hereinafter, a spread illuminating apparatus 10 according to one embodiment of the present invention will be explained. As shown in FIG. 1, the spread illuminating apparatus 10 includes LEDs 11 as light sources which emit white light, a light guide plate 21 that emits light emitted by the LEDs 11 in a spread pattern, and an FPC (Flexible Printed Circuit Board) 31 as a circuit board on which the LEDs 11 are mounted.

In the present embodiment, each LED 11 is a so-called side view type LED that is formed in an overall rectangular parallelepiped shape and has a light emitting surface 12 on one side surface thereof. In other words, in each LED 11, a surface (hereinafter referred to as the "bottom surface") 13 that is mounted on the FPC 31 is substantially orthogonal to the light emitting surface 12. As shown in FIG. 7, each LED 11 has a structure in which a blue light-emitting diode 41, which is a light-emitting element, is enclosed in a transparent resin (enclosure) 42 in which yellow fluorescent bodies are dispersed. Therein, an emission spectrum that appears white (so-called quasi-white) is realized by the mixture of blue light emitted by the blue light-emitting diode 41 and yellow light emitted by the yellow fluorescent bodies which have absorbed the blue light.

Figure 2:
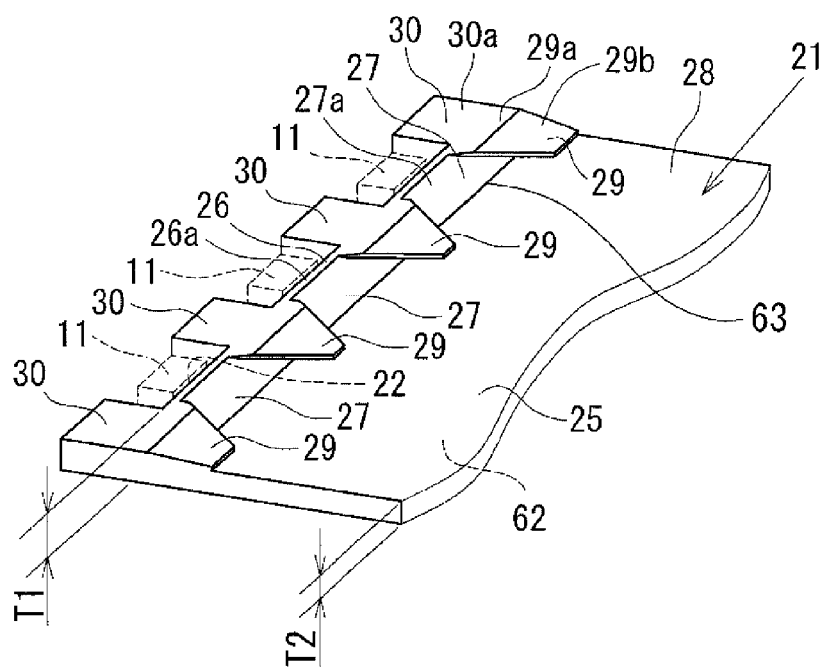
FIG. 2 is partially enlarged schematic view illustrating the essential parts of a light guide plate of the spread illuminating apparatus shown in FIG. 1.

In the present embodiment, there are three LEDs 11 arranged along a incident light surface 22 with predetermined intervals therebetween in a state in which the light emitting surfaces 12 thereof are facing the incident light surface 22 (to be explained later) of the light guide plate 21 (refer to FIG. 2).

The light guide plate 21 is formed in a rectangular shape when viewed from the top surface using a transparent material (for example, a polycarbonate resin). On its outer surface, the light guide plate 21 includes the incident light surface 22, which is an end surface at which the LEDs 11 are disposed. In the light guide plate 21, the emitting surface 25 and the inclined surface 27*a* (to be explained later) are included on a surface of the light guide plate 21 that is connected to one edge (22*c*) among the two edges 22*c* and 22*d* in the lengthwise direction (the direction orthogonal to the paper surface in FIG. 1) of the incident light surface 22. Hereinafter, the surface of the light guide plate 21 which includes the emitting surface 25 will be referred to as a top surface 61, and the surface on the opposite side of the top surface 61 will be referred to as an underside surface 62.

Herein, in the present invention, a direction from the incident light surface 22 toward the end surface (omitted from the drawings) opposing the incident light surface 22 (the rightward direction on the paper surface in FIG. 1) will be referred to as the "forward/front" direction (the opposite direction will be referred to as the "backward/back" direction). The "forward/front" direction as defined in this way is also the overall direction in which light that has entered from the incident light surface 22 into the light guide plate 21 is guided through the light guide plate 21. Thus, in these terms, the front-back direction defined as above will also be referred to as the "light guide direction".

A direction in which the underside surface 62 faces the top surface 61 (the upward direction on the paper surface in FIG. 1) will be defined as the "upward" direction (the opposite direction will be defined as the "downward" direction), and the up-down direction according to these definitions will also be referred to as the "thickness direction". Further, a direction orthogonal to the front-back direction and the up-down direction (the direction orthogonal to the paper surface in FIG. 1) will be referred to as the left-right direction (if necessary, "rightward" and "leftward" are defined facing the forward direction). In other words, the left-right direction is the lengthwise direction of the incident light surface 22. Further, unless explicitly stated otherwise, the terms "length", "thickness", and "width" refer respectively to the dimensions in the front-back direction, the up-down direction, and the left-right direction.

The light guide plate 21 includes a flat part 26 formed in the forward direction from the incident light surface 22, an incident light wedge part 27 that is formed connected to the flat part 26 and includes the inclined surface 27*a*, and an emitting part 28 that is formed in the forward direction connected to the incident light wedge part 27 and emits light from the LEDs 11 that has been guided through the incident light wedge part 27 in a spread pattern from the emitting surface 25. The underside surface 62 of the light guide plate 21 is formed in a single flat surface throughout the flat part 26, the incident light wedge part 27, and the emitting part 28. Meanwhile, the inclined surface 27*a* of the incident light wedge part 27 is formed to be inclined downwards toward the forward direction from the incident light surface 22 side. Thereby, the thickness of the incident light wedge part 27 tapers from the incident light surface 22 side moving toward the forward direction (in other words, toward the emitting surface 25 side).

The flat part 26 has a constant thickness and is formed such that a top surface 26*a* which is a surface on the top surface 61 side is substantially orthogonal to the incident light surface 22. The emitting part 28 is formed in a rectangular flat plate shape with a constant thickness and the emitting surface 25 and the underside surface 62, which are flat surfaces that are substantially orthogonal to the incident light surface 22, oppose each other substantially in parallel as the two principal surfaces of the flat plate shape. The emitting surface 25 is formed connected to an edge 63 that is in the forward direction from the inclined surface 27*a*. In the spread illuminating apparatus 10, a virtual flat surface (omitted from the drawings) that includes the edge 63 and is orthogonal to the emitting surface 25 constitutes a boundary between the incident light wedge part 27 and the emitting part 28 (hereinafter, in these terms, reference numeral 63 will be assigned to this boundary between the incident light wedge part 27 and the emitting part 28).

In the spread illuminating apparatus 10, on the underside surface 62 side of the emitting part 28, an optical path modifying pattern (omitted from the drawings) consisting of, for example, a plurality of dots can be formed, and light can be emitted in a spread pattern from the emitting surface 25 upon modifying the progression direction of light that is guided through the emitting part 28 by this optical path modifying pattern.

Also, in the spread illuminating apparatus 10, on the underside surface 62 side of the light guide plate 21, a reflecting sheet 51 is disposed for returning light that has leaked from the underside surface 62 into the light guide plate 21 again. On the emitting surface 25 side of the emitting part 28, a diffusing sheet 52 and a pair of prism sheets 53 and 54 are successively laminated on each other in order to control the directivity of light that is emitted from the emitting surface 25.

In addition, on the top surface 61 side of the light guide plate 21, a light blocking sheet 55 is disposed to cover at least the LEDs 11 and a region of the light guide plate 21 on the incident light surface 22 side (including the flat part 26, the incident light wedge part 27, and a region of the emitting part 28 toward the incident light wedge part 27). In the spread illuminating apparatus 10, a region of the emitting part 28 that is not covered by the light blocking sheet 55 is set as the effective emitting region E, and light emitted from the effective emitting region E is utilized as illumination light. In addition to the constituent members illustrated in FIG. 1, the spread illuminating apparatus 10 can have other constituent members such as a frame for accommodating the constituent members.

The light guide plate 21 also includes a plurality of pedestals 29 (four in the present embodiment) formed spaced apart from each other on the inclined surface 27a side of the incident light wedge part 27, and a plurality of pawl parts 30 (four in the present embodiment) formed spaced apart from each other so as to protrude in the backward direction from the incident light surface 22. Referring to FIGS. 1 and 2, the pedestals 29 and the pawl parts 30 of the light guide plate 21 will be explained in detail below.

The four pedestals 29 are for fixing (mounting) the FPC 31, and are formed spaced apart from each other so that they do not exist in portions in front of the three LEDs 11 (illustrated by dashed lines in FIG. 2) in the inclined surface 27a and the portion near the inclined surface 27a of the emitting surface 25. The top surface of each pedestal 29 functions as a receiving surface on which the FPC 31 is mounted, and includes a first surface 29a that is formed on the incident light surface 22 side, and a second surface 29b that is formed in the forward direction of the first surface 29a and is inclined on the incident light wedge part 27 side from the first surface 29a side toward the forward direction (in other words, inclines in the inclination direction of the inclined surface 27a). Each pedestal 29 is formed so that the width of the shape when viewed from the top surface decreases towards the forward direction on the forward distal tip side.

Herein, each pedestal 29 has a fixed thickness toward the forward direction from the incident light surface 22 up to the boundary with the second surface 29b, and the first surface 29a that constitutes the top surface of each pedestal 29 over this region is formed to be substantially orthogonal to the incident light surface 22. The first surface 29a is formed substantially flush with the top surface 26a of the flat part 26. In other words, the first surface 29a of each pedestal 29 has a shape obtained by extending the flat part 26 in the forward direction excluding the portions in front of the LEDs 11.

The second surface 29b of each pedestal 29 is formed to be inclined more gently than the inclined surface 27a of the incident light wedge part 27 from the incident light surface 22 side toward the forward direction, and to extend in the forward direction farther than the edge 63 in front of the inclined surface 27a. The inclination angle of the second surface 29b of each pedestal 29 relative to the emitting surface 25 is smaller than the inclination angle of the inclined surface 27a of the incident light wedge part 27 relative to the emitting surface 25.

The pawl parts 30 are for fixing the FPC 31 similar to the pedestals 29, and each pawl part 30 is formed in a rectangular parallelepiped shape that extends in the backward direction from both sides of a region of the incident light surface 22 that faces the LED 11. Each pawl part 30 is formed such that a top surface 30a thereof is substantially flush with the top surface 26a of the flat part 26 and the first surface 29a of the pedestal 29.

In the case that portions of the top surface 26a of the flat part 26, the first and second surfaces 29a and 29b of the pedestals 29, and the top surfaces 30a of the pawl parts 30 are partially joined to the FPC 31, recessed parts in which an adhesive (for example, double-sided tape) is disposed can be provided on the surface parts that are to be partially joined.

Figure 3A:
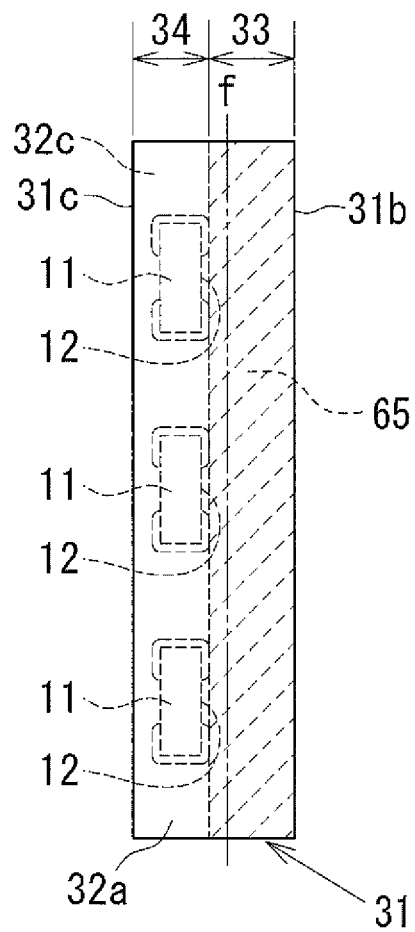
FIG. 3A is a plan view of an FPC of the spread illuminating apparatus shown in FIG. 1.

Next, as shown in FIG. 3A, the FPC 31 is formed in a narrow strip shape when viewed from the top surface, and the width thereof (the dimension of the long sides 31b and 31c) is formed to be approximately the same as the dimension in the lengthwise direction of the incident light surface 22 of the light guide plate 21. The LEDs 11 are mounted on the FPC 31 from a surface 32c side of the FPC 31. Therein, the LEDs 11 are mounted along the long side 31c on the backward direction side of the FPC 31 in a state in which the light emitting surfaces 12 are substantially orthogonal to both surfaces 32a and 32c of the FPC 31 and substantially parallel to the long sides 31b and 31c of the FPC 31.

The FPC 31 on which the LEDs 11 are mounted is adhered and fixed onto the light guide plate 21 while positioned such that the surface 32c on which the LEDs 11 are mounted is facing the light guide plate 21 and the light emitting surfaces 12 of the LEDs 11 are opposing predetermined positions (between adjacent pawl parts 30, 30) of the incident light surface 22 of the light guide plate 21.

Therein, the first and second surfaces 29a and 29b of the pedestals 29, the top surface 26a of the flat part 26, and the top surfaces 30a of the pawl parts 30 (the cross-hatched portions in FIG. 313) become joint surfaces (contact surfaces) with the surface 32c of the FPC 31 that faces the light guide plate 21. The FPC 31 is bent at a bending position f corresponding to the boundary between the first surface 29a and the second surface 29b of the pedestals 29, and portions corresponding to the joint surfaces among the portion in the backward direction from the bending position f are joined respectively onto the top surfaces 30a of the pawl parts 30, the top surface 26a of the flat part 26, and the first surfaces 29a of the pedestals 29. Portions corresponding to the second surfaces 29b of the pedestals 29 among the portion in the forward direction from the bending position f are joined onto the second surfaces 29b.

By fixing the FPC 31 onto to the light guide plate 21 in this way, the LEDs 11 are positioned and fixed relative to the light guide plate 21. Also, in the spread illuminating apparatus 10, when the FPC 31 is positioned and fixed onto the light guide plate 21, the FPC 31 and the pedestals 29 are configured such that the long side 31b in the forward direction of the FPC 31 is positioned at least in the forward direction of the edge 63 in front of the inclined surface 27a. Preferably, the position in the front-back direction of the long side 31b in the forward direction of the FPC 31 matches the position in the front-back direction of the forward end of the pedestals 29.

Further, in the spread illuminating apparatus 10, in a portion 33 of the FPC 31 that is forward relative to the LEDs 11, a blue light reflecting unit 65 (the portion with dashed cross-hatching in FIG. 3A) is provided on the surface 32c that faces the light guide plate 21. Herein, the blue light reflecting unit 65 is a reflecting means whose reflectance ratio for light emitted by the blue light-emitting diode 41 of the LEDs 11 is relatively greater than the reflectance ratio for light of other colors (particularly, light having a wavelength longer than that of blue light, such as colored light in the range from red light to green light including yellow light). The blue light reflecting unit 65 is specifically formed by applying blue ink having such reflectance ratio characteristics onto the surface 32c facing the light guide plate 21 of the portion 33 of the FPC 31 that is forward relative to the LEDs 11.

In a state in which the FPC 31 is fixed onto the light guide plate 21, the blue light reflecting unit 65 constituted as described above is disposed near the boundary 63 between the incident light wedge part 27 and the emitting part 28 such that it spans across the boundary 63 between the incident light wedge part 27 and the emitting part 28 to cover the inclined surface 27a and the region of the emitting surface 25 toward the incident light wedge part 27. Therein, a portion of the blue light reflecting unit 65 in the forward direction from the bending position f is disposed to be inclined in the inclination direction of the inclined surface 27a of the incident light wedge part 27 along the second surfaces 29b of the pedestals 29.

The operational effects of the spread illuminating apparatus 10 constituted as described above will now be explained as follows. In the spread illuminating apparatus 10, the blue light reflecting unit 65 is disposed on the emitting surface 25 side near the boundary 63 between the incident light wedge part 27 and the emitting part 28, and thereby a blue light component of light that enters the blue light reflecting unit 65 among light that has leaked from the incident light wedge part 27 and the region of the emitting part 28 toward the incident light wedge part 27 (for example, light indicated by the arrow mark BY in FIG. 1) can be selectively returned into the light guide plate (therein, a yellow light component is typically absorbed by the blue light reflecting unit 65). The blue light that is returned into the light guide plate 21 by reflection (for example, the light indicated by arrow mark 13 in FIG. 1) is guided through the incident light wedge part 27 and the region of the emitting part 28 toward the incident light wedge part 27 while being reflected one or more times between the top surface 61 side and the underside surface 62 side, and then is emitted from a region toward the incident light surface 22 of the effective emitting region E of the emitting surface 25. Thus, the light emitted from this region which would have originally had a yellow tint is supplemented with blue light, and as a result, visible color unevenness (incident light color unevenness) which arises due to the light emitted from the region toward the incident light surface 22 of the effective emitting region E exhibiting a yellow tint is suppressed. In turn, a spread illuminating apparatus 10 with excellent color tone uniformity of emitted light can be provided.

Herein, when the light L1 (refer to FIG. 7), which is emitted from the LEDs 11 used in the spread illuminating apparatus 10 in a direction in which the angle that forms the optical axis thereof is large, enters directly, or after being reflected one or more times between the top surface 61 side and the underside surface 62 side of the incident light wedge part 27, into the inclined surface 27a of the incident light wedge part 27, it enters at a relatively small incident angle. Therefore, it becomes light with a strong yellow tint compared to the lights L2 and L3, which are emitted in a direction in which the angle that forms the optical axis thereof is small, and also becomes light that leaks easily from the inclined surface 27a. Accordingly, when using LEDs 11 that have a structure in which a blue light-emitting diode 41 is enclosed in a transparent resin 42 in which yellow fluorescent bodies are dispersed as in the LEDs 11, a relatively large yellow light component is included in the light that leaks from the inclined surface 27a, and thus the above-described operational effects of the spread illuminating apparatus 10 are more prominently achieved.

However, the white light source of the spread illuminating apparatus according to the present invention is not limited to the LEDs 11. For example, the light source of the spread illuminating apparatus according to the present invention can be an LED having a structure in which a blue light-emitting diode 41 is enclosed in a transparent resin in which fluorescent bodies that convert to light of a different color than yellow having a longer wavelength than that of blue light (for example, green fluorescent bodies and red fluorescent bodies) are dispersed. In this case, remarkable effects similar to those of the spread illuminating apparatus 10 including the LEDs 11 are achieved.

Further, regardless of the type of light source, as long as it emits white light, the emission spectrum of the light source can include a light component included in the wavelength range of blue light and a light component included in a wavelength range of wavelengths longer than that of blue light. Therefore, the structure including blue light reflecting unit 65 of the spread illuminating apparatus according to the present invention achieves a constant effect for suppressing incident light color unevenness.

For example, the light source of the spread illuminating apparatus according to the present invention can be an LED including a plurality of different types of light-emitting elements (typically a blue light-emitting diode, a green light-emitting diode, and a red light-emitting diode). Also, in a light source constituted by a light-emitting element of a single color and a wavelength converting material, the wavelength converting material can be a quantum dot.

Also, in the spread illuminating apparatus 10, the blue light reflecting unit 65 is disposed so as to span across the boundary 63 between the incident light wedge part 27 and the emitting part 28. Therefore, a blue light component among light that has leaked from the incident light wedge part 27 and the region of the emitting part 28 toward the incident light wedge part 27 is more reliably returned into the light guide plate 21, and thus incident light color unevenness can be more effectively suppressed.

Further, in the spread illuminating apparatus 10, a portion of the blue light reflecting unit 65 in the forward direction from the bending position f of the FPC 31 is disposed to be inclined in the inclination direction of the inclined surface 27a of the incident light wedge part 27 along the second surfaces 29b of the pedestals 29. Thereby, an interval between the emitting surface 25 in the portion in front of the LEDs 11 and the blue light reflecting unit 65 narrows moving forward, and thus a blue light component among light that has leaked from the incident light wedge part 27 and the region of the emitting part 28 toward the incident light wedge part 27 is efficiently returned into the light guide plate 21 (for example, it is returned as is without progressing to the emitting surface 25 side) by the portion of the blue light reflecting unit 65 that is disposed to be inclined in the inclination direction of the inclined surface 27a. Accordingly, incident light color unevenness can be more effectively suppressed.

In the spread illuminating apparatus 10, since the interval between the emitting surface 25 in the portion in front of the LEDs 11 and the blue light reflecting unit 65 (in other words, the FPC 31 on which the blue light reflecting unit 65 is provided) narrows moving forward, light that has leaked from the incident light wedge part 27 and the region of the emitting part 28 toward the incident light wedge part 27 can be stopped (by the reflection of the blue light component and the absorption of the yellow light component) from progressing to the emitting surface 25 side. This is also advantageous with respect to enhancing the brightness uniformity of emitted light on the incident light surface 22 side of the effective emitting region E.

In the spread illuminating apparatus 10, by providing the blue light reflecting unit 65 on the surface 32c facing the light guide plate 21 of the FPC 31 on which the LEDs 11 are mounted, the blue light reflecting unit 65 can be easily provided using the FPC 31 without increasing the number of parts. Also, the blue light component of light that has leaked from the incident light wedge part 27 and the region of the emitting part 28 toward the incident light wedge part 27 can be efficiently returned into the light guide plate by the blue light reflecting unit 65.

In the spread illuminating apparatus 10, by providing the pedestals 29 on which the FPC 31 is disposed on the inclined surface 27a side of the incident light wedge part 27, a gap can be formed between the inclined surface 27a in the portions in front of the LEDs 11 and the FPC 31 in a state in which the FPC 31 is disposed on the pedestals 29. Therefore, direct absorption by the FPC 31 of light that has reached the inclined surface 27a after entering into the light guide plate 21 can be suppressed, and light emitted from the LEDs 11 can be efficiently guided via the incident light wedge part 27.

In the spread illuminating apparatus 10, the receiving surface of each pedestal 29 is constituted by the first surface 29a formed on the incident light surface 22 side of the light guide plate 21 and the second surface 29b that is formed in the forward direction of the first surface 29a and is inclined on the incident light wedge part 27 side from the first surface 29a side toward the forward direction. Thereby, the FPC 31 is bent following the inclination of the second surface 29b relative to the first surface 29a at the bending position f (refer to FIG. 3A) corresponding to the boundary between the first surface 29a and the second surface 29b, and the FPC 31 is disposed and fixed on the first and second surfaces 29a and 29b of the pedestals 29.

This structure of the spread illuminating apparatus 10 is advantageous in that the advantageous arrangement structure of the blue light reflecting unit 65, in which the blue light reflecting unit 65 is disposed spanning across the boundary 63 between the incident light wedge part 27 and the emitting part 28 and includes a portion that is inclined in the inclination direction of the inclined surface 27a of the incident light wedge part 27 by providing the blue light reflecting unit 65 on the FPC 31 on which the LEDs 11 are mounted, can be easily realized by positioning and fixing the FPC 31 on the pedestals 29.

In the spread illuminating apparatus 10, the first surface 29a formed on the incident light surface 22 side of the light guide plate 21 and the second surface 29b that is formed in the forward direction of the first surface 29a and is inclined on the incident light wedge part 27 side from the first surface 29a side toward the forward direction are provided on the receiving surface of each pedestal 29, and the second surface 29b is formed to be inclined gently relative to the first surface 29a (in other words, the inclination angle of the second surface 29b relative to the emitting surface 25 is decreased). Thereby, any opposing force of the bending at the bending position f of the FPC 31 is reduced, and the surface area of the second surface 29b can be widened. Thus, the surface area for fixation of the FPC 31 can be increased, and this is advantageous in that the long-term stability of the arrangement and fixation of the FPC 31, and in turn the blue light reflecting unit 65, on the light guide plate 21 can be improved.

In the spread illuminating apparatus 10, the existence of the flat part 26 is not essential from the perspective of the optical function, and the flat part 26 does not necessarily have to be provided. However, it is preferable to provide the flat part 26 in order to increase the surface area for fixation between the FPC 31 and the light guide plate 21 and to stabilize the positioning and fixation between the light guide plate 21 and the LEDs 11. Thereby, the brightness uniformity of illumination light can be stably maintained over a longer period of time.

Figure 3B:
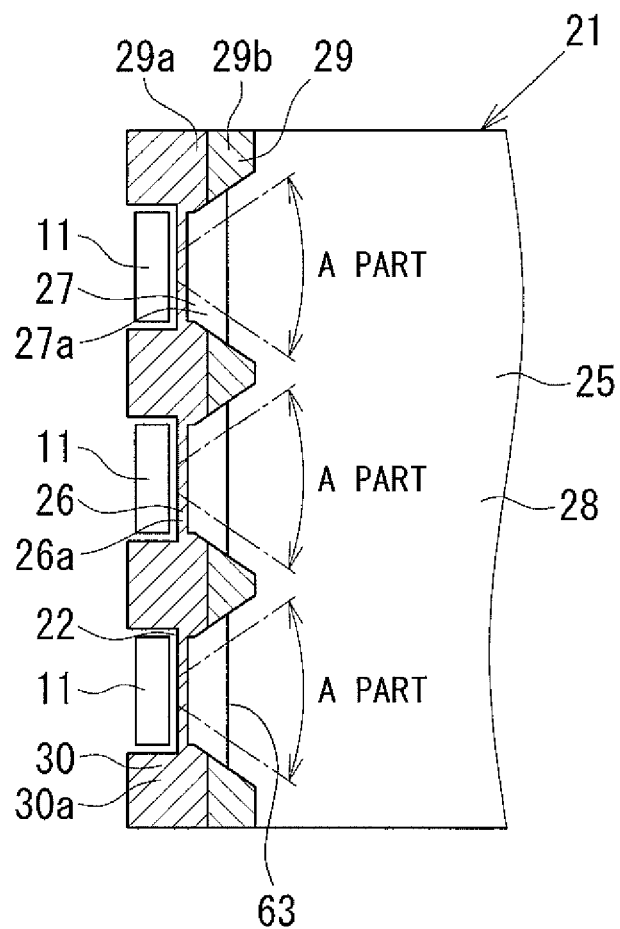
FIG. 3B is a plan view of the essential parts of the light guide plate of the spread illuminating apparatus shown in FIG. 1.

Further, as indicated by the "A parts" in FIG. 3B, light emitted from the incident light surface 22 of the LEDs 11 progresses through the light guide plate 21 in a fan shape toward the forward direction. Therefore, in the spread illuminating apparatus 10, the structure in which the width of the pedestals 29 when viewed from the top surface decreases towards the forward direction on the forward distal tip side is advantageous in that the interval between adjacent pedestals 29 widens toward the forward direction, and thus the surface area of the first surface 29a and the second surface 29b of the pedestals 29 can be increased as much as possible without blocking the progression of light that is guided through the incident light wedge part 27. Therefore, the adhesion strength between the FPC 31 and the light guide plate 21 can be improved, and in turn the stability of the arrangement fixation of the blue light reflecting unit 65 on the light guide plate 21 can also be improved.

Herein, similar to the measurements using the spread illuminating apparatus 100 explained above with reference to FIGS. 5 and 6, FIG. 4 illustrates the results upon measuring with a color brightness photometer the color of emitted light at a multiple measurement points on the light guide plate 21 using the spread illuminating apparatus 10 according to one embodiment of the present invention. The tapering ratio of the spread illuminating apparatus 10 used in the measurements was set to 73%, which is the same as that of the spread illuminating apparatus 100.

In the graph shown in FIG. 4A, the vertical axis is an x coordinate value (chromaticity x) on an xy chromaticity diagram of the CIE color specification system, and the horizontal axis is a distance X [mm] in a light guide direction from a position in the effective emitting region E of the light guide plate 21 that is closest to the incident light surface 22 side (for example, a position at the forward end of the light blocking sheet 55) as a starting point. In the graph shown in FIG. 4B, the vertical axis is a y coordinate value (chromaticity y) on an xy chromaticity diagram of the CIE color specification system, and the horizontal axis is a distance X [mm] in the light guide direction from a position in the effective emitting region E of the light guide plate 21 that is closest to the incident light surface 22 side as a starting point. In FIGS. 4A and 4B, the range shown on the horizontal axis corresponds to approximately the entire length of the effective emitting region E of the light guide plate 21. Further, the measurement points are located approximately in the center in the width direction of the light guide plate 21.

Comparing the results shown in FIGS. 4A and 4B and the results using the spread illuminating apparatus 100 shown in FIGS. 5B and 5C, it can be understood that the values near the starting point of both the chromaticity x and the chromaticity y are remarkably small, and thus the uniformity of the chromaticity is improved over the entire effective emitting region E including the incident light surface 22 side. According to the measurement results shown in FIGS. 4A and 4B, the incident light chromaticity difference of the spread illuminating apparatus 10 has been improved to 0.007 compared to the incident light chromaticity difference of the spread illuminating apparatus 100 which was 0.015. In this way, the spread illuminating apparatus 10 effectively suppresses incident light color unevenness of light emitted from the effective emitting region E of the light guide plate 21.

A preferred embodiment of the present invention was explained above, but the present invention is not limited to this embodiment and various modifications and combinations are possible within a scope that does not deviate from the gist of the present invention.

For example, the blue light reflecting unit 65 can be disposed on only the incident light wedge part 27 or only the emitting part 28. Further, the blue light reflecting unit 65 can be disposed individually on both of the incident light wedge part 27 and the emitting part 28 without spanning across the boundary 63 between the incident light wedge part 27 and the emitting part 28.

Also, the blue light reflecting unit 65 can be provided by attaching a film consisting of a blue light reflecting material to the FPC 31. Further, as long as the blue light reflecting unit 65 is provided on at least the portions in front of the LEDs 11, for example, it can be disposed to be interspersed along the lengthwise direction of the FPC 31. The blue light reflecting unit 65 can also include portions provided at positions besides the portions in front of the LEDs 11, such as on the sides of the LEDs 11.

Further, the blue light reflecting unit 65 can be provided at a predetermined position of the reflecting sheet 51 (preferably, the surface thereof that faces the light guide plate 21). If the FPC 31 is disposed on the underside surface 62 side of the light guide plate 21, the blue light reflecting unit 65 can be provided on either or both of the FPC 31 and the reflecting sheet 51. The blue light reflecting unit 65 can also be provided on the optical sheet(s) disposed on the emitting surface 25 side of the light guide plate 21 (for example, the diffusing sheet 52 whose end is extended up to the inclined surface 27a). In all of these cases, the blue light reflecting unit 65 can be provided by applying blue ink or attaching a blue film at predetermined positions on each member. Alternatively, the blue light reflecting unit 65 can be constituted using a separate member other than the FPC 31, the reflecting sheet 51, and the optical sheets 52, 53, and 54.

In the spread illuminating apparatus 10 according to the present invention, the pedestals 29 on which the FPC 31 is disposed do not necessarily have to be provided. If the pedestals 29 are not provided, the FPC 31 can be disposed on the top surface 61 side by, for example, fixing the FPC 31 to the light blocking sheet 55.

The inclined surface 27a of the incident light wedge part 27 can be provided on the underside surface 62 side instead of the top surface 61 side (the emitting surface 25 side). Alternatively, the inclined surface 27a can be provided on both the top surface 61 side and the underside surface 62 side. In all of these cases, i.e., if the inclined surface 27a is provided on only the top surface 61 side, or is provided on only the underside surface 62 side, or is provided on both the top surface 61 side and the underside surface 62 side, the shape of the inclined surface 27a does not have to be a flat surface that inclines with a constant gradient, and, for example, it can include a curved surface or multiple flat surfaces having different gradients.

What is claimed is:

1. A spread illuminating apparatus comprising:
a light source that emits white light, and
a light guide plate including an incident light surface which is an end surface at which the light source is disposed and an emitting part that emits light which has entered from the incident light surface in a spread pattern from an emitting surface which is one principal surface, wherein
the light guide plate includes an incident light wedge part between the incident light surface and the emitting part, the incident light wedge part including an inclined surface and tapering in thickness from the incident light surface side toward a forward direction,
a blue light reflecting unit is disposed on a surface of a circuit board on which the light source is mounted, the surface of the circuit board facing the light guide plate,
the blue light reflecting unit is placed near a boundary between the incident light wedge part and the emitting part so as to span across the boundary,
the blue light reflecting unit includes a portion disposed to be inclined in an inclination direction of the inclined surface,
the circuit board is disposed on a pedestal, the pedestal being provided on the inclined surface side of the incident light wedge parts, and the pedestal being configured so as to not be disposed in a portion in front of the light source and
a gap is provided between the inclined surface of the light guide plate and the circuit board.

2. The spread illuminating apparatus according to claim 1, wherein the light source includes a light-emitting element and fluorescent bodies that receive and emit light that is emitted by the light-emitting element.

3. The spread illuminating apparatus according to claim 2 wherein the light-emitting element is a blue light-emitting diode that emits blue light, and the fluorescent bodies are yellow fluorescent bodies that emit yellow light.

4. The spread illuminating apparatus according to claim 2, wherein the fluorescent bodies are dispersed in an enclosure that covers the light-emitting element.

5. The spread illuminating apparatus according to claim 1, wherein a tapering ratio of the incident light wedge part of the light guide plate is set to 85% or less.

* * * * *